United States Patent [19]
Yano et al.

[11] 3,986,476
[45] Oct. 19, 1976

[54] APPARATUS FOR COATING A LIQUID ON OPPOSITE SIDES OF A FLEXIBLE SHEET MATERIAL

[75] Inventors: Eizi Yano, Higashimurayama; Shunjiro Ohkawa, Iruma; Tadaaki Komatsu, Akigawa, all of Japan

[73] Assignee: Bridgestone Tire Company Limited, Kyoba, Japan

[22] Filed: Apr. 18, 1975

[21] Appl. No.: 569,385

[30] Foreign Application Priority Data
Apr. 30, 1974 Japan.................. 49-49197

[52] U.S. Cl. .................... 118/2; 118/7; 118/301; 118/314; 118/324; 118/DIG. 4
[51] Int. Cl.² .............. B05C 5/00; B05C 9/04; B05C 11/10
[58] Field of Search .............. 118/301, 324, 16, 24, 118/DIG. 14, 7, 8, 66, 2, 314

[56] References Cited
UNITED STATES PATENTS

| | | | |
|---|---|---|---|
| 2,450,681 | 10/1948 | Muench................ | 118/66 |
| 2,878,776 | 3/1959 | Vogel.................... | 118/24 |
| 3,242,003 | 3/1966 | Brown................... | 118/DIG. 4 |
| 3,364,898 | 1/1968 | Russell.................. | 118/DIG. 4 |
| 3,467,063 | 9/1969 | Brinkley et al. ....... | 118/324 X |
| 3,872,824 | 3/1975 | Erny et al. ............ | 118/7 |
| R24,835 | 6/1960 | Christianson et al. .. | 118/16 X |

FOREIGN PATENTS OR APPLICATIONS

| | | | |
|---|---|---|---|
| 1,921,154 | 11/1970 | Germany ............... | 118/DIG. 4 |

Primary Examiner—John P. McIntosh
Attorney, Agent, or Firm—Haseltine, Lake & Waters

[57] ABSTRACT

An apparatus for coating a liquid on opposite sides of a flexible material, which is particularly suitable for use in applying a splicing cement to predetermined surface areas on obverse and reverse sides of a vehicle tire tread. The apparatus comprises in combination: first sheet conveying means for transferring a flexible sheet material through a first coating position; first liquid coating means located at the first sheet coating position for applying a coating liquid on a predetermined surface on an obverse side of the sheet material; second sheet conveying means for transferring the flexible sheet material through a second liquid coating position; second liquid coating means located at the second coating position for applying the coating liquid on predetermined surface on a reverse side of the sheet material; and turn-over means located between the first and second sheet conveying means for transferring the flexible sheet material upside-down from the first to the second sheet conveying means. The first and second coating means each has a coating liquid reservoir which has a transverse slit in the bottom wall for allowing the coating liquid to drop by gravity forming a liquid film across passage of the transferred sheet material.

7 Claims, 11 Drawing Figures

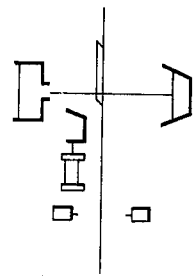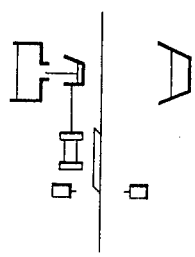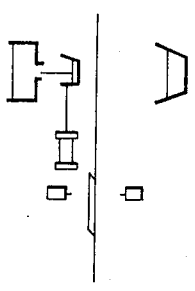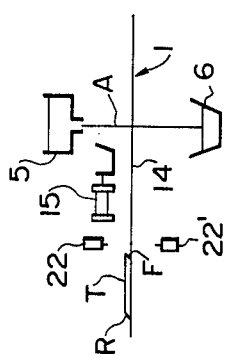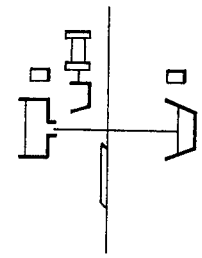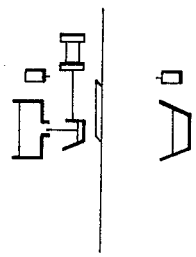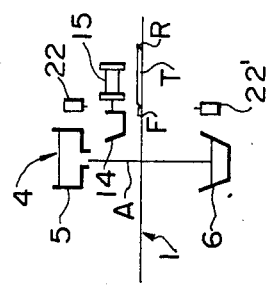
FIG. 4(a) FIG. 4(b) FIG. 4(c) FIG. 4(d)
FIG. 5(a) FIG. 5(b) FIG. 5(c) FIG. 5(d)

APPARATUS FOR COATING A LIQUID ON OPPOSITE SIDES OF A FLEXIBLE SHEET MATERIAL

This invention relates to an apparatus for coating a liquid on opposite sides of a flexible sheet material, which is particularly suitable for use in applying a splicing cement to predetermined surfaces on obverse and reverse sides of a vehicle tire tread.

The application of the splicing cement to splicing surfaces on opposite sides of tire treads which have been cut into unit lengths has thus far depended on manual labors. The manual cement application usually involves repetition of simple but hard operations and thus is very inefficient. In the manual operation, the tire thread is forcibly flexed in order to apply the cement simultaneously to the splicing surfaces on the opposite sides of the tread. The overstrained deformation naturally gives adverse effects to the tread and often results in non-uniformity of the coated cement, contributing to lower the efficiency in the subsequent shaping process and spoiling the quality of the tires of ultimate products.

There have been devised various apparatus and methods for automation of the splicing cement applying operation, including, for example, a method using a reciprocating brush or a method of spraying the splicing cement under high pressure. The method using a coating brush gives rise to a problem of non-uniformity of the coated splicing cement due to deterioration of the coating brush. The spraying method, on the other hand, has a difficulty in that scattering liquid is allowed to deposit on unnecessary surface areas of the tread or to spoil the working environment. For these reasons, the conventional methods may contribute to a certain degree to the enhancement of productivity but cannot be a decisive solution to the problems regarding the uniform application of the splicing cement and improvement of the quality of the ultimate tire products.

It is an object of the present invention to provide a novel apparatus for uniformly coating a liquid on opposite sides of a flexible sheet material. It is a more particular object of the invention to provide an apparatus for uniformly coating a liquid on opposite sides of a flexible sheet material like a vehicle tire tread, which can be suitably employed for the application of a splicing cement on predetermined splicing surfaces on the obverse and reverse sides of the tire tread.

It is another object of the invention to provide a splicing cement applicator machine for vehicle tire treads, which employs a cement reservoir with a transverse slit in the bottom wall for allowing the splicing cement to drop by gravity forming a liquid film across the passage of the tire tread, in combination with intercepting means which is movable toward and away from the liquid film for intercepting the same in timed relation with the feed of the tire tread to be coated.

In one particular form of the invention, the apparatus comprises in combination: first sheet conveying means for transferring a flexible sheet material through a first coating position; first liquid coating means located at the first coating position for applying a coating liquid on a predetermined surface on an obverse side of the flexible sheet material; second sheet conveying means for transferring the flexible sheet material through a second coating position; second liquid coating means located at the second coating position for applying the coating liquid on a predetermined surface on the reverse side of the sheet material; and turn-over means located between the first and second sheet conveying means for transferring the flexible sheet material upside-down from the first sheet conveying means to the second conveying means; the first and second coating means each including an upper trough positioned over the passage of the sheet material and reservoiring the coating liquid, the upper trough having in the bottom wall a transverse slit to allow the coating liquid to fall therethrough by gravity forming a liquid film extending across the passage of the flexible sheet material, a lower trough positioned beneath the passage of the sheet material in vertical alignmet with the upper trough for receiving the fluid fallen filmwise through the transverse slit of the upper trough, intercepting means located between the upper and lower troughs and movable toward and away from the liquid film in timed relation with the speed of transfer of the flexible sheet material for intercepting the liquid film while a non-coating portion of the sheet material is passing through the respective coating position, and detecting means for detecting arrival of the flexible material at the respective coating position.

The afore-mentioned first and second coating means preferably include means for recirculating to the upper trough the coating liquid which has been received by the lower trough. Where the apparatus is applied as a splicing cement applicator machine for tire treads, drying means is provided downstream of the first and second coating means for drying the splicing cement applied, with a gas discharging means for positively purging the gases which are evaporated from the cement during in the drying stage.

In the preferred form of the invention, the intercepting means include a movable trough having a front side indented complementarily to the shape of a coating surface of the sheet material and a fluid-operated cylinder fixedly mounted on a frame structure and having its piston rod connected to the rear end of the movable trough for urging the same toward and away from the liquid film in timed relation with the feed of the flexible sheet material. The first and second sheet conveying means may be in the form of ordinary roller conveyors which are spaced apart vertically from each other in a staggered relation with an outlet end of the first sheet conveying means projected outwardly beyond the inlet end of the second conveying means. The turnover means may also be provided in the form of a conveyor extending slantingly between the outlet end of the first conveying means and the inlet end of the second conveying means and having its upper end disposed at a space from the outlet of the first conveying means to allow passage therethrough of the flexible sheet material to be transferred to the second conveying means.

The features and advantages of the apparatus according to the present invention will become more apparent from the following description taken in conjunction with the accompanying drawings, in which:

FIGS. 4a to 4d are diagrammatic views showing operational steps of the first splicing cement applicator of the cement applicator machine; and FIGS. 5a to 5d are diagrammatic views showing operational steps of a second splicing cement applicator of the cement applicator machine.

The invention will now be described more particularly with reference to a preferred embodiment shown in the accompanying drawings. Though the following description is directed to a splicing cement applicator machine for vehicle tire treads, it is to be understood that the invention can suitably be applied to various flexible sheet materials other than tire treads to be coated by another various coating liquids.

Figure 1:
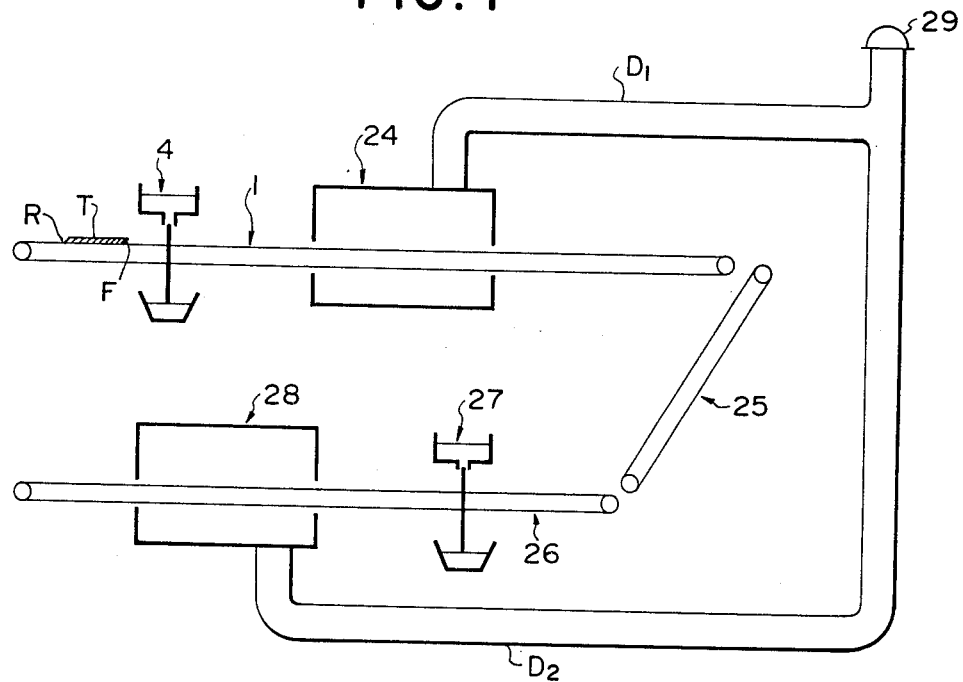
FIG. 1 is a diagrammatic side elevational view of a tire tread splicing cement applicator machine embodying the present invention.
Figure 3:
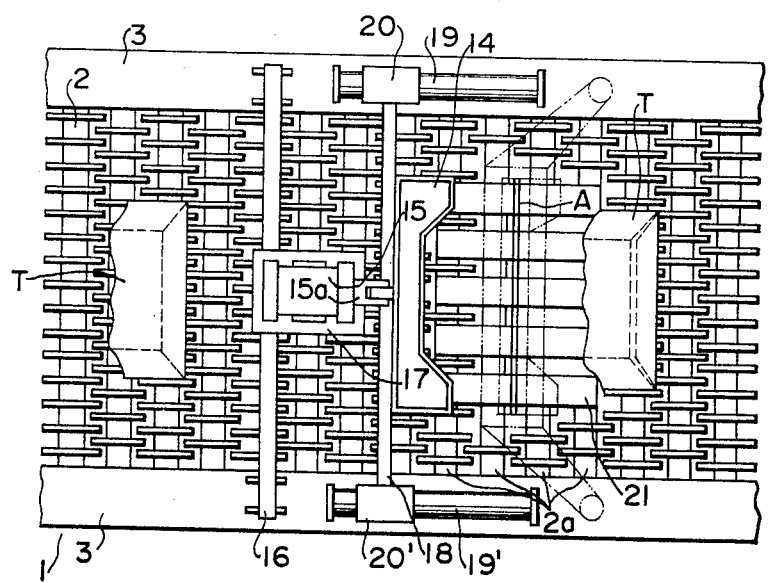
FIG. 3 is a fragmentary plan view showing the first splicing cement applicator illustrated in FIG. 1.
Figure 2:
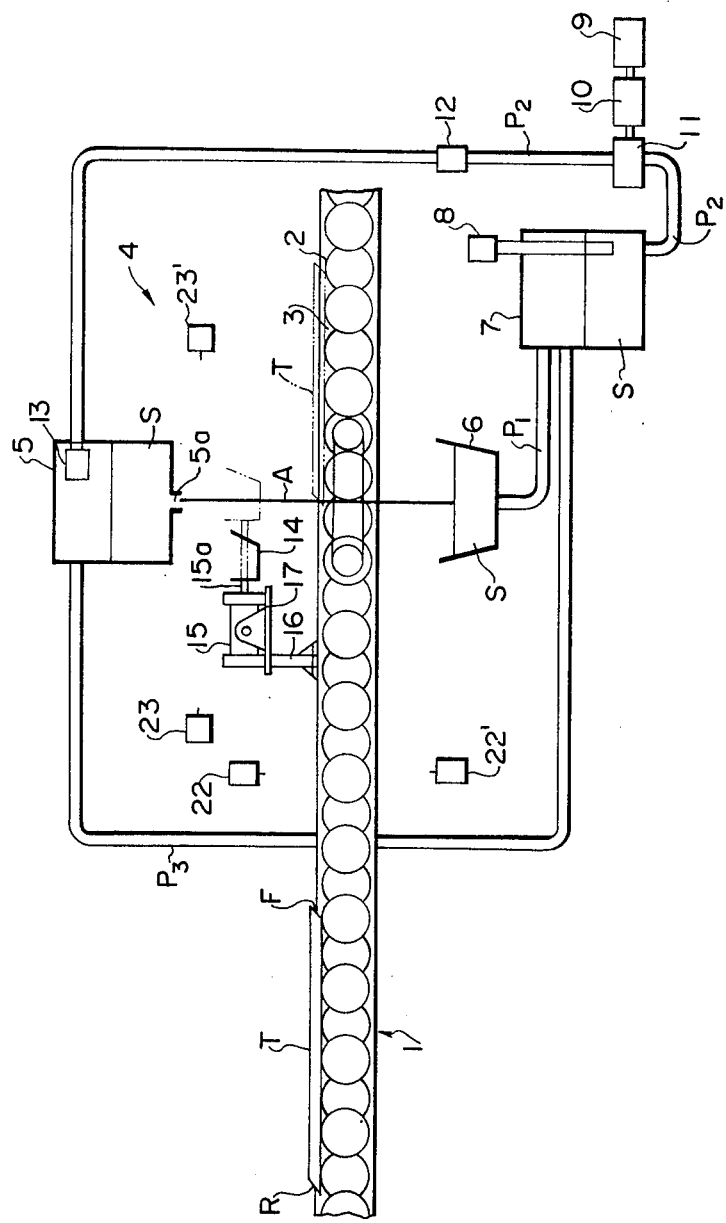
FIG. 2 is a side elevational view of a first splicing cement applicator of the cement applicator machine illustrated in FIG. 1.

Referring first to FIGS. 1 to 3, the apparatus of the invention includes a first sheet transfer mechanism which is generally indicated at 1 and which is provided in the form of a roller conveyor with a number of parallelly aligned flanged rollers 2. The opposite ends of the flanged rollers 2 are supported in bearings (not shown) of frames 3. Each one of the flanged rollers 2 has secured to one end thereof a sprocket wheel (not shown) which is in engagement with a driving chain (not shown). A roller driving sprocket wheel (not shown) is secured at one end of the flanged roller 2 of the first sheet transfer mechanism 1 side-by-side with the first-mentioned sprocket wheel. The roller driving sprocket wheel is driven from an electric motor (not shown) through a chain (not shown) and transmits the driving torque of the motor to the sprocket wheels of the respective flanged rollers 2 through the first-mentioned driving chain for transferring a flexible sheet material toward a first splicing cement applicator 4 which is located at a first coating position in the manner as will be described in greater detail hereinlater.

In this instance, a tire tread T which has been cut into a predetermined unit length is transferred to the first splicing cement applicator 4 by the first sheet transfer mechanism 1.

The first splicing cement applicator 4 includes a tank or reservoir 5 which is located at a position overhead the above-mentioned first sheet transfer mechanism 1 and which contains a suitable amount of splicing cement S. The splicing cement S in the upper tank 5 is allowed to drop onto the first sheet transfer mechanism 1 by gravity through a slit 5a which is formed in the bottom wall of the tank 5, forming a liquid film or membrane A. The liquid film A is received by a tank or trough 6 which is located immediately beneath the first transfer mechanism 1. The splicing cement S received by the lower trough 6 is sent to a stock tank 7 through a connecting pipe $P_1$. The stock tank 7 is provided with a liquid surface detector 8 which detects the surface level of the splicing cement S within the stock tank 7 for controlling purposes. The splicing cement S collected in the stock tank 7 is returned through a pipe $P_2$ to the head tank 5 by the action of a pump 11 which is driven from a motor 9 through a reduction gear 10. A filter 12 is provided between the pump 11 and the head tank 5 and another filter 13 is provided in the head tank 5 which is connected to the pipe $P_2$, for removing twofold the foreign matter which may be entrained in the splicing cement S. The head tank 5 is connected further by a pipe $P_3$ to the stock tank 7 in order to prevent overflow of the splicing cement S in the head tank 5.

Between the head tank 5 and the first transfer mechanism 1, a trough 14 is mounted on a piston rod 15a of a fluid-operated cylinder 15 for intercepting the liquid film A. The fluid-operated cylinder 15 is securely mounted on a support plate 17. The plate 17 is fixedly mounted on a support frame 16 which is bridged between the frames 3 at opposite sides of the flanged rollers 2. The trough 14 has attached to its rear end a slide bar 18 which has at opposite ends cylindrical sliders 20 and 20' in slidable engagement with parallelly mounted guide rods 19 and 19' on the frames 3. The trough 14 has at its fore end an indentation of a shape complementary to the shape of the surface to be spliced, as seen in a plan view. In the particular embodiment shown, the fore end of the trough 14 is indented in a shape complementary to the splicing surface of the tread T. By shaping the trough 14 in this manner, the splicing cement S can be coated exactly on a predetermined splicing surface of the tread T. The splicing cement S may be applied in a more complicate shape by providing an indentation of a corresponding shape at the front side of the intercepting trough 14.

The flanges of the rollers 2a of the first transfer mechanism 1 in the vicinity of the passage of the liquid film A are removed over a distance corresponding to the width of the liquid film A. In this connection, in order to prevent the flexible tread T from falling through the gap which is formed between the rollers by the removal of the flanges, a number of strips or belts 21 are extended over the flange-less roller portions in the direction of the tread transfer. A pair of photoelectric tubes 22 and 22' are located in vertical alignment with each other over and beneath the first transfer mechanism 1 to detect the arrival of the tread T at a predetermined position before the liquid film A as seen in the direction of the tread transfer. Another pair of photoelectric tubes 23 and 23' are located on opposite sides of the liquid film A for detection of breakages or cleavages which may appear in the liquid film A due to exhaustion of the splicing cement S in the head tank 5 or clogging of the slit 5a. The photoelectric tubes 23 and 23' are connected to a suitable warning device for producing a warning signal upon detection of the film breakage.

Referring to FIG. 4, when the tread T is transferred to a first coating position immediately before the first splicing cement applicator 4 by the action of the first transfer mechanism 1, the fore or leading end F of the tread T is detected by the photoelectric tubes 22 and 22' (FIG. 4a) and, after a lapse of a predetermined time period, the fluid-operated cylinder 15 is actuated to project forwardly the piston rod 15a. As a result, the liquid film A is intercepted by the trough 14 at the fore end of the piston rod 15a (FIG. 4b). Then, the photoelectric tubes 22 and 22' detect the rear end R of the tread T (FIG. 4c), and, after a predetermined time lapse, that is to say, as soon as the splicing surface R of the tread T comes to the point immediately beneath the liquid film A which is now intercepted by the trough 14, the fluid-operated cylinder 15 is actuated to retract backwardly the piston rod 15a thereby releasing and allowing the liquid film A to fall by gravity onto the splicing face of the tread T. The splicing cement S is applied in a shape same as the splicing surface R owing to the provision of an indentation of a corresponding shape at the front side of the trough 14. In this manner, the application of the splicing cement S to a splicing surface on an obverse side of the tread T is completed (FIG. 4d).

Referring again to FIG. 1, first drying means which denoted generally at 24 is provided around the first transfer mechanism 1 past the first splicing cement applicator 4 for drying the splicing cement S which has been coated on the splicing surface R on the obverse side of the tread T. The first drying means may be of the air injection type of known construction and preferably includes a gas discharging means (not shown) for positively purging to the outside the gases which are released from the drying splicing cement, through a gas exhaustion duct $D_1$ which leads to a suitable gas outlet.

In this manner, the tread T which has been applied with the splicing cement on the obverse splicing surface R is transferred by the first transfer mechanism 1 to the first drying means 24 where the splicing cement S is completely dried.

The turn-over means 25 has the same construction as the afore-mentioned first transfer mechanism 1 and therefore its description is omitted herein avoid unnecessary repetitions. The upper end of the turn-over means 25 is disposed at a space from the outlet end of the first transfer mechanism 1 to allow passage therethrough of the tread T.

The tread T which has come out of the first drying means 24, with the dried cement on the splicing surface R, is handed over from the first transfer mechanism 1 to the turn-over means 25 through the gap space between the outlet end of the first transfer mechanism 1 and the upper end of the turn-over means 25. As the tread T is advanced through the gap space, it is turned upside-down, and then transferred to a second transfer mechanism which will be described in greater detail hereinlater, with the splicing surface F on the reverse side of the tread T disposed upwardly.

The second transfer mechanism 26 has the same construction as the afore-mentioned first transfer means 1 and therefore its description is omitted herein to avoid repetitions. The tread receiving end of the second transfer mechanism 26 is disposed closely to the lower end of the turn-over means 25.

The second splicing cement applicator which is generally indicated at 27 has the same construction as the afore-mentioned first splicing cement applicator 4.

As the tread T is conveyed into the vicinity of the second splicing cement applicator 27 by the action of the second transfer mechanism 26, the leading end of the splicing surface F is detected by photoelectric tubes 22 and 22' (FIG. 5a) and then the splicing face F is passed through the liquid film A of the splicing cement S which is coated on the splicing face of this time (FIG. 5b). Upon lapse of a predetermined time period after detection of the rear end of the splicing face R by the photoelectric tubes 22 and 22', that is to say, after the splicing surface F is coated with the cement S in a predetermined width, the fluid-operated cylinder 15 is actuated to project forwardly the piston rod 15a. Whereupon, the liquid film A is intercepted by a trough 14 to complete the coating operation on the splicing face F on the reverse side of the tread T (FIG. 5c). While the liquid film A is intercepted by the trough 14, the tread portion succeeding the splicing face F are passed without receiving the splicing cement S on their surfaces. Upon a predetermined time lapse after detection of the rear end of the splicing face R by the photoelectric tubes 22 and 22', the fluid-operated cylinder 15 is operated to retract the piston rod 15a thereby releasing the liquid film A from the interception by the trough 14 and allowing the same to drop by gravity into the lower trough 6.

A second drying means 28 is located around the passage of the tread T past the second splicing cement applicator 27 for drying the cement coated on the splicing face F on the reverse side of the tread T. The second drying means 28 is also of the air injection type and provided with a gas discharging means (not shown) for positively purging to the outside the gases which will be released from the coated splicing cement S during the drying treatment, through an exhaustion duct $D_2$ which is joined to the afore-mentioned exhaustion duct $D_1$ of the first drying means 24 at a position upstream of the gas outlet 29.

In this manner, the tread T which has been applied with the splicing cement S on the splicing surface F by the second splicing cement applicator 27 is transferred to the second drying means 28 by the action of the second transfer mechanism 26 for completely drying the coated splicing cement S.

Thus, as will be understood from the foregoing description, the tread T which comes out of the second drying means 28 has the dried coating of splicing cement S on both of the obverse and reverse splicing surfaces F and R.

It will be understood from the foregoing description that, according to the present invention, the splicing cement can be securely and uniformly coated on the predetermined splicing surfaces on opposite sides of the tread. As no coating tools such as brushes are employed in applying the splicing cement, the tires of the ultimate products will be completely free from such flaws as will occur due to deterioration of the coating tools, contributing to enhance the productivity and quality of the tires to a considerable degree.

What is claimed is:

1. An apparatus for coating a liquid onto opposite sides of a flexible sheet material, comprising: first and second conveying means for transferring the sheet material through respective first and second coating positions; first and second coating means, respectively at said first and second coating positions, for applying a coating liquid to respective front and reverse sides of the sheet material; and turn-over means between said conveying means for transferring the sheet material upside-down from said first to said second conveying means; both said coating means including an upper trough over the passage of the sheet material for storing the liquid, said trough having in its bottom wall a transverse slit to allow the liquid to run therethrough by gravity, forming a liquid film extending across the passage, a lower trough beneath the passage, in vertical alignment with said upper trough, for receiving the liquid film, intercepting means located between said troughs and including a movable trough and an actuator for urging said movable trough toward and away from the film in timed relation with the feeding speed of transfer of the sheet material, for intercepting the film, while a non-coated surface of the sheet material passes through the respective coating position, at least said movable trough being operative for coating a surface connected in transversely side-by-side relation to the non-coated surface of the sheet material, having a peripheral wall indented complementarily to the shape of the coating surface, and means for detecting arrival of the sheet material at the coating position to energize said actuator to urge said movable trough toward and away from the film in the timed relation as aforesaid.

2. The apparatus as defined in claim 1, wherein the flexible sheet material is a tread of a vehicle tire, and the coating liquid is a splicing cement.

3. The apparatus as defined in claim 1, wherein said actuator is in the form of a fluid-operated cylinder having a piston rod, being fixedly mounted on a frame structure, and supporting said movable trough at the leading end of said piston rod.

4. The apparatus as defined in claim 1, wherein said both said conveying means are in the form of vertically spaced-apart, staggered roller conveyors, with an outlet end of said first conveying means projecting outwardly beyond an inlet end of said second conveying means, and said turn-over means being also in the form of a conveyor that extends slantingly between said outlet and said inlet ends, said turn-over means having its upper end disposed at the distance from said outlet end to allow the passage therethrough the the flexible sheet material.

5. The apparatus as defined in claim 4, wherein said first conveying means has a transversely extending opening allowing the film to pass therethrough.

6. The apparatus as defined in claim 1, wherein said detecting means is in the form of photoelectric tubes in vertical alignment over and beneath said conveying means.

7. The apparatus as defined in claim 6, further comprising second detecting means in the form of photoelectric tubes on opposite sides of the film, for detection of an interruption in the continuity of the film.

* * * * *